US012682738B2

(12) United States Patent
Bressanutti et al.

(10) Patent No.: US 12,682,738 B2
(45) Date of Patent: Jul. 14, 2026

(54) OPTICAL CHAMBER BASE WITH INTEGRATED REFLECTIVE SURFACES FOR PARTICLE DETECTION

(71) Applicant: Honeywell International Inc., Charlotte, NC (US)

(72) Inventors: Massimo Bressanutti, Sesto al Reghena (IT); Andrea Frison, Monfalcone (IT); Andrea Chiatti, Trieste (IT); Maurizio Berliavaz, Trieste (IT)

(73) Assignee: Honeywell International Inc., Charlotte, NC (US)

( * ) Notice: Subject to any disclaimer, the term of this patent is extended or adjusted under 35 U.S.C. 154(b) by 180 days.

(21) Appl. No.: 18/379,288

(22) Filed: Oct. 12, 2023

(65) Prior Publication Data

US 2025/0123204 A1     Apr. 17, 2025

(51) Int. Cl.
    | | |
    |---|---|
    | *G08B 17/113* | (2006.01) |
    | *G01N 15/00* | (2024.01) |
    | *G01N 15/075* | (2024.01) |
    | *G01N 21/53* | (2006.01) |
    | *G08B 17/107* | (2006.01) |

(52) U.S. Cl.
    CPC ......... *G08B 17/113* (2013.01); *G01N 15/075* (2024.01); *G01N 21/53* (2013.01); *G08B 17/107* (2013.01); *G01N 2015/0046* (2013.01); *G01N 2201/0636* (2013.01)

(58) Field of Classification Search
    CPC .......... G01N 21/53; G01N 2201/0636; G01N 15/075; G01N 2015/0046; G08B 17/107; G08B 17/113
    See application file for complete search history.

(56) References Cited

U.S. PATENT DOCUMENTS

| | | | | |
|---|---|---|---|---|
| 5,451,931 | A * | 9/1995 | Muller ................. | G08B 17/113 |
| | | | | 340/630 |
| 6,351,219 | B1 * | 2/2002 | Tanguay .............. | G08B 17/107 |
| | | | | 340/630 |
| 7,940,190 | B2 | 5/2011 | Penney et al. | |
| 2002/0154018 | A1 * | 10/2002 | Nishikawa ............ | G08B 17/06 |
| | | | | 340/630 |
| 2013/0176131 | A1 | 7/2013 | Pichard et al. | |

(Continued)

FOREIGN PATENT DOCUMENTS

| | | |
|---|---|---|
| CN | 102622847 A | 8/2012 |
| CN | 209803962 U | 12/2019 |

(Continued)

*Primary Examiner* — Jennifer D Bennett

(74) *Attorney, Agent, or Firm* — Brooks, Cameron & Huebsch, PLLC

(57) ABSTRACT

Devices, systems, and methods for providing an optical chamber base for smoke detection with integrated reflective surfaces for optical particle detection are described herein. One unitary reflective component insert includes a unitary reflective component insert body having a non-reflective portion and a reflective portion and wherein the reflective portion forms two emitter mirrors and a receiver mirror, wherein the emitter mirrors are shaped to direct light emitted from emitters positioned below the emitter mirrors toward a scattering zone of the optical chamber.

19 Claims, 5 Drawing Sheets

(56)         References Cited

U.S. PATENT DOCUMENTS

2014/0168647 A1*   6/2014   Ju ........................ G08B 17/107
                                                  29/527.1
2018/0061215 A1*   3/2018   Vollenweider ....... G08B 17/117
2018/0306715 A1*  10/2018   Yamasaki ............. G01N 21/53
2020/0033246 A1*   1/2020   Jobert ................ G01N 15/0211
2020/0386677 A1*  12/2020   Deliwala .............. G01J 3/0208
2021/0123863 A1*   4/2021   Gadonniex .......... G08B 17/107
2023/0033431 A1    2/2023   Yamaguchi
2023/0152204 A1    5/2023   Chiatti et al.
2023/0152205 A1    5/2023   Zhang et al.
2024/0203226 A1*   6/2024   Hlushchenko ....... G08B 17/107

FOREIGN PATENT DOCUMENTS

EP          0740146  A2    10/1996
EP          1887536  A1  *  2/2008   .......... G08B 17/107
EP          3584775  A1    12/2019
JP          7186312  B2    12/2022
WO       2020247187  A1    12/2020

* cited by examiner

OPTICAL CHAMBER BASE WITH INTEGRATED REFLECTIVE SURFACES FOR PARTICLE DETECTION

TECHNICAL FIELD

The present disclosure relates to devices, systems, and methods for providing an optical chamber base with integrated reflective surfaces for particle detection.

BACKGROUND

Facilities (e.g., buildings), such as commercial facilities, office buildings, hospitals, and the like, may have a fire detection system that can be triggered during an emergency situation (e.g., a fire) to warn occupants to evacuate. For example, a fire detection system may include a fire alarm control panel within the building and a plurality of smoke detectors located throughout the facility (e.g., on different floors and/or in different rooms of the facility) that can sense a smoke condition indicative of a fire occurring in the facility and provide a notification of the smoke condition to the occupants of the facility and/or building monitoring personnel via alarms or other mechanisms.

Such detectors can use preconfigured optical blocks that include, in the case of detection of a single forward scattering signal, only:

an emitter;

a receiver; and one or more plastic parts for holding and alignment of optic components.

Various types of such optical configurations are utilized presently.

These optical blocks are integrated into a system that also includes a printed circuit board (PCB) for the electrical connection of optical emitters and receivers and other mechanical parts (e.g., plastic covers with wings) that direct the smoke particulate toward the detection zone and complete the configuration of the sensing chamber used to sense a fire condition.

In one prior implementation, the emitters and receivers are carried by a plastic optical block that provides a fixed orientation and barriers therebetween. The optical block with the emitter and the receiver and a metal shield constitutes a surface mounted device (SMD) that, through a plurality of pick-and-place areas, can be placed on the printed circuit board with an automatic assembly process.

The optical block surface mounted device configuration is an advantage with respect to the manual soldering of optical emitters and receivers. However, the optical block is a custom surface mounted device component that has low scalability (for example, it is very difficult to integrate further detection based components, for example, for backward scattering by adding other surface mounted device components) and its pick-and-place process is complex and susceptible to generating rejected pieces.

In another prior art configuration, two prisms (one for light emission and one for light reception), often made of a transparent resin material, are disposed in a guide hole in the light-emission axis direction: the two prisms accommodate, respectively, an emitter and a receiver. The two prisms have a total-reflection surface and a lens that causes light to be directed and condensed to and from the sensing zone.

This prior configuration has the advantage of permitting the use of standard and commercial surface mounted device emitters and receivers, mounted with standard Surface Mount Technology (SMT) on the printed circuit board; the functionality to direct and collect light to and from smoke particulate is assured by two prisms with total reflection surfaces and lenses. However, this optical system is substantially composed of different parts that include two prisms and a box-shaped main body with dedicated guide holes that cover them. This prior design offers the convenience of using commercial surface mounted device emitters and receivers but has a higher number of components (at least a dedicated main body and two prisms, in addition to the surface mounted device emitters and receivers) and, thereby, may not be as desirable.

Other prior designs use lightguides or multiple separate reflecting components to direct or collect light to and from SMD or through hole optical emitters and receivers (see for examples EP3584775A1 and WO2020247187A1). Using lightguides has the advantage to direct light precisely and efficiently but lightguide manufacturing can be affected by the problem of the formation of bubbles during molding. Accordingly, accurate quality control is expensive and does not assure a complete detection of defects.

The quality of reflective surfaces can be controlled more easily, so these components are produced separately. For typical systems having a dual optical/dual wavelength optical sensing configuration with SMD components, three mirrors and only small parts of the optical chamber must be made reflective while the rest of the chamber must be black and equipped with light traps to reduce unwanted reflections. So, the manufacturer usually places different, multiple small mirrors in the different locations in close proximity of optical emitters and receivers. However, the placement of these mirrors can result in improper alignment leading to poor performance.

DETAILED DESCRIPTION

Figure 1:
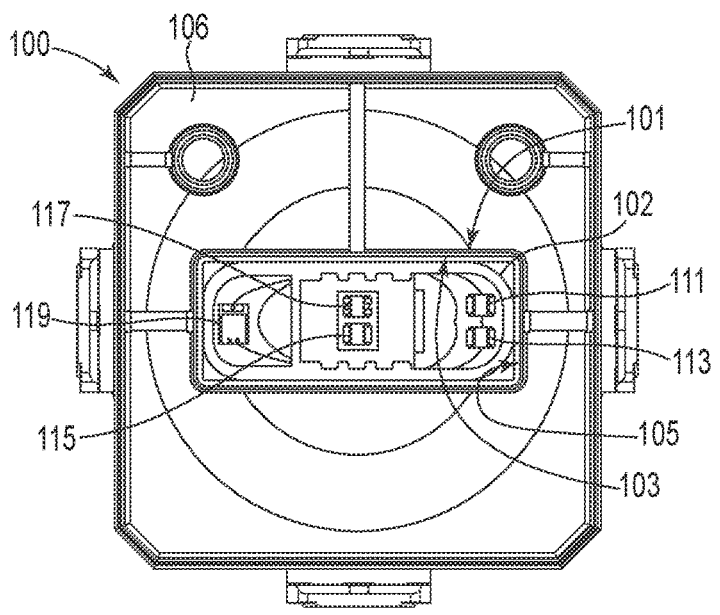
FIG. 1 is a top view of a chamber base of a smoke detector optical chamber in accordance with one or more embodiments of the present disclosure.

Devices, systems, and methods for providing an optical chamber base for smoke detection with integrated reflective surfaces for optical particle detection are described herein. The present disclosure pertains to optical smoke detectors or multi-criteria smoke detectors that use an optical system to detect light scattered by particulate (e.g., smoke particulate): these systems generally include a sensing chamber (where particulate enters), optical emitters, receivers, and electronic control circuits to operate the system.

The embodiments of the present disclosure are intended to overcome the above issues by providing a solution that integrates simplicity of the assembling process (e.g., SMT, minimization of the number of mechanical parts), scalability to dual angle/dual wavelength (2A/2W) optical detection, cost-effectiveness while maintaining good optical sensitivity, and/or high immunity to nuisance sources.

The chamber base embodiments of the present disclosure are unique as multiple reflective surfaces (e.g., two to direct light from two front scattering emitters into the scattering/sensing zone and one to collect light from the sensing zone to the receiver) are integrated into one reflective plastic part (a unitary reflective component insert) which can be pre-assembled and merged into the rest of the non-reflective (e.g., black) chamber base (the non-reflective part can be a two or three-material molded part). In this way, a unique part, the chamber base, can arrive to the smoke detector manufacturing automatic placement location and can be precisely aligned (also due to the optional three alignment pegs of the chamber base that fit three holes in the printed circuit board (PCB) which assure a relative accurate positioning of the reflective surfaces with optical emitters and receivers) and mounted on the PCB through what can be a completely automatic process.

In this detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 in FIG. 2.

As used herein, "a", "an", or "a number of" something can refer to one or more such things, while "a plurality of" something can refer to more than one such things. For example, "a number of components" can refer to one or more components, while "a plurality of components" can refer to more than one component.

FIG. 1 is a top view of a chamber base of a smoke detector optical chamber in accordance with one or more embodiments of the present disclosure. The chamber base 100 includes a chamber base body 106 having a unitary reflective component insert 102 positioned therein. As illustrated, at least portions of the side walls and end walls of the recess in the chamber base body (generally rectangular aperture 101) are designed to tightly abut against at least portions of the side walls 103 and end walls 105 of the unitary reflective component insert 102.

In the example illustrated in FIG. 1, the corners of the unitary reflective component insert 102 are rounded and, thereby, not all of the side wall surfaces and end wall surfaces are in contact with each other. The interaction between the side walls and end walls of the chamber base aperture 101 and the unitary reflective component insert 102 allow for precise alignment between the components on the unitary reflective component insert 102 and the chamber base body 106.

Figure 2:
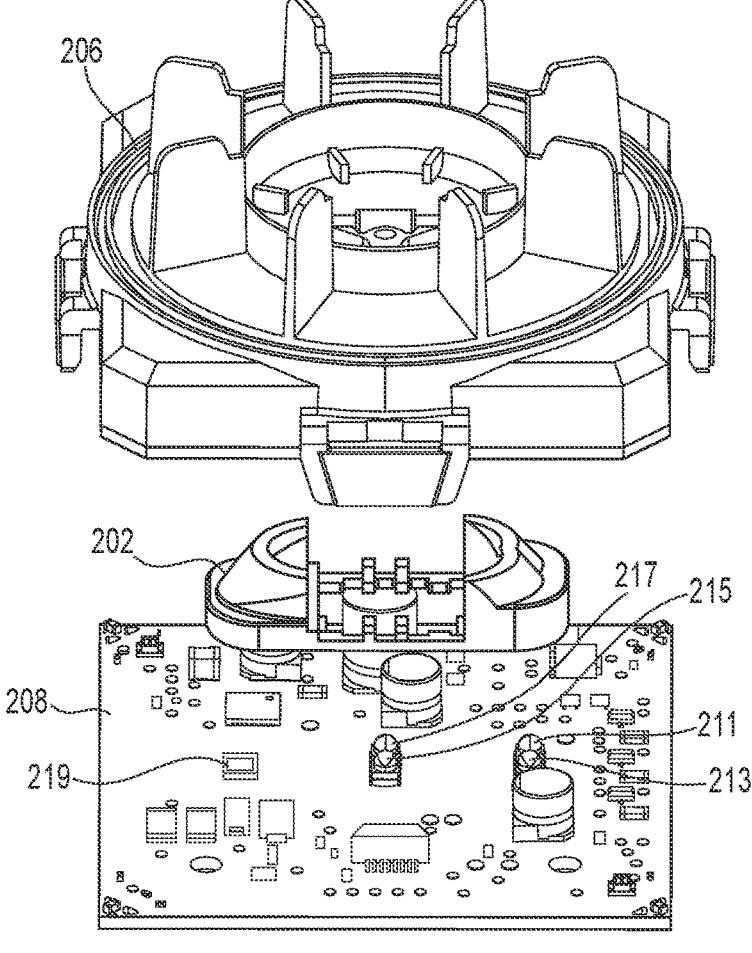
FIG. 2 is an exploded view of a smoke detector optical chamber components in accordance with one or more embodiments of the present disclosure.

This alignment can lead to precise alignment with components on the circuit board (receiver 219 and emitters 211, 213, 215, and 217 of FIG. 2) as illustrated in FIG. 2. Although the circuit board is not shown in FIG. 1, receiver 119 and emitters 111, 113, 115, and 117 are illustrated to show the orientation and positioning of those components to the chamber base body 106 and unitary reflective component insert 102. Such precise positioning between these seven components can be easily achieved by embodiments of the present disclosure.

FIG. 2 is an exploded view of smoke detector optical chamber components in accordance with one or more embodiments of the present disclosure. In the embodiment illustrated in FIG. 2, the smoke detector optical chamber components include the chamber base body 206, the unitary reflective component insert 202 and the circuit board 208 with receiver 219 and emitters 211, 213, 215, and 217.

The assembling process of smoke detectors with optical chambers having reflective surfaces can, for example, include different stages, such as the following: SMT circuit board assembly; placement of the circuit board on the detector base; covering of the circuit board with the circuit board cover (chamber base body 206, in this example) with reflective surfaces (provided in the unitary reflective component insert in this example); placement of the chamber cover on the circuit board cover; mounting of the smoke detector cover; smoke detector microcontroller programming, calibration, and prepackage testing; and smoke detector packaging.

In the embodiments of the present disclosure, the unitary reflective component insert 202 includes reflective surfaces that act as mirrors to direct light from the emitters as discussed in more detail below. The components on the circuit board that work in concert with the reflective surfaces include a set of forward scattering emitters 211 and 213 (e.g., surface mounted type emitters) positioned below the reflective surface emitter mirrors 326/328 (of FIG. 3) that are part of the unitary reflective component insert 202/302. Also included are a set of backward scattering emitters 215 and 217 (e.g., surface mounted type emitters) that are positioned within a backward scattering cavity 442 (of FIG. 4A) formed within the chamber base body 206/406. Additionally, a receiver 219 (e.g., surface mounted type receiver)

is positioned below a reflective surface receiver mirror 324 (of FIG. 3) that are part of the unitary reflective component insert 202/302.

The optical chamber base with a unitary reflective component insert embodiments for forming the optical chamber of a smoke detector as discussed herein can be integrated in many current photoelectric based smoke detector designs. As discussed, a unique optical chamber base with a unitary reflective component insert can be formed by three parts:

a circuit board where, for example, surface mounted device (SMD) components (e.g., four SMD emitters (two forward scattering and two backward scattering) and one SMD receiver) are mounted, for example, with standard SMT assembly processes (e.g., circuit board) 208;

a unitary reflective component insert 202; and a chamber base body 206.

FIG. 2 illustrates a circuit board of a smoke detector of a fire alarm system that can be utilized with one or more embodiments of the present disclosure. Preferably, a circuit board integrates the emitters, the receiver, and all the electronic circuits necessary to drive the emitters and collect, analyze, and/or transmit the information from the receiver to, for example, a control panel of a fire system (located remotely from the detector device).

To implement a dual angle/dual wavelength configuration, a single receiver and four emitters (e.g., one infrared 411 and one blue 413 emitter for forward optical scattering, one infrared 417 and one blue 415 emitter for backward optical scattering) configuration can be utilized. Such an embodiment is illustrated in FIG. 2, where a printed circuit board 208 includes a set of forward scattering emitters (211 and 213) and a set of backward scattering emitters (215 and 217) and a receiver 219 provided thereon.

The electronic circuit can pulse one emitter at a time and the radiation coming from this emitter, scattered by smoke, is collected by the receiver generating the related optical signal. During a cycle (e.g., of 4 seconds) all of the four emitters can be pulsed in sequence (e.g., every second) generating at the receiver four different optical signals (e.g., Infrared Forward Scattering (IR FS), Blue Forward Scattering (Blue FS), Infrared Backward Scattering (IR BS), and Blue Backward Scattering (Blue BS)). As used herein, a suitable infrared wavelength emitter is in the range of between 700 nm to 1 mm and a suitable blue wavelength emitter is in the range of between 400 to 525 nm. In some implementations, such as in high sensitivity applications, where more optical power is needed, to pulse multiple emitters at the same time (for example, two Backward Scattering emitters with the same wavelength or two Forward Scattering emitters with the same wavelength), generating at the receiver an optical signal with double amplitude. In some implementations, an infrared light source can be substituted with a red light source and/or instead of a blue light source, a UV light source could be utilized.

Smoke detectors are important components in some types of fire detection systems. Also, important are the controllers that provide the detection analysis, alarming functionality, and communication functions with other fire system devices. The circuit board 208, designed according to embodiments of the present disclosure, can provide these functions in one unitary circuit board. The signals discussed above from the receiver can be stored in memory and/or analyzed by a controller on the printed circuit board or connected thereto to determine, for example, whether a fire condition exists near the detector.

The type of data obtained by the dedicated software in firmware in the controller and/or stored in memory can be volatile integer data representing an amount of particulate detected within the smoke detector optical chamber. Additionally, this data can be stored in random access memory (RAM) and used for fire alarm generation or, at application level, stored into a non-volatile RAM (NVRAM) for diagnostic purposes to evaluate the particulate density using different types of algorithms (e.g., average, mode, etc.). This layer can be provided, for example, at the fire system control panel.

One example embodiment of the present disclosure includes a smoke detector of a fire sensing system, including a circuit board body, having a set of front scattering emitting light sources located on one side of an optical chamber, a receiver of front scattering light beams from the front scattering emitting light sources and backward scattering light beams, and a set of backward scattering emitting light sources located between the set of front scattering emitting light sources and the receiver, the backward scattering light beams emitted from the backward scattering emitters. These light beams are directed to the receiver via the reflective surfaces of the unitary reflective component insert. The elements and benefits of the unitary reflective component insert are discussed in more detail with respect to FIGS. 3A and 3B.

Figure 3A:
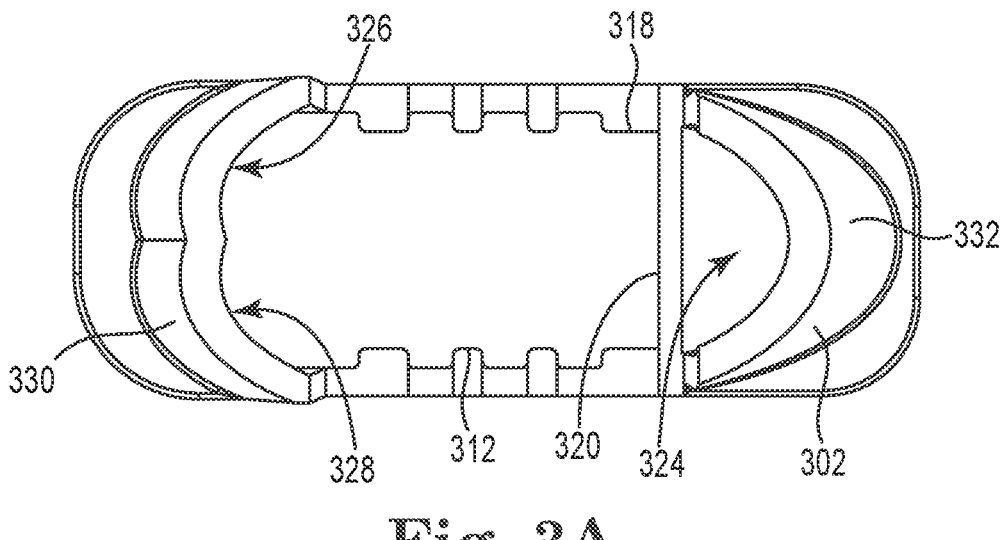
FIG. 3A is a top view of a reflective component insert of a smoke detector of a fire alarm system in accordance with one or more embodiments of the present disclosure.
Figure 3B:
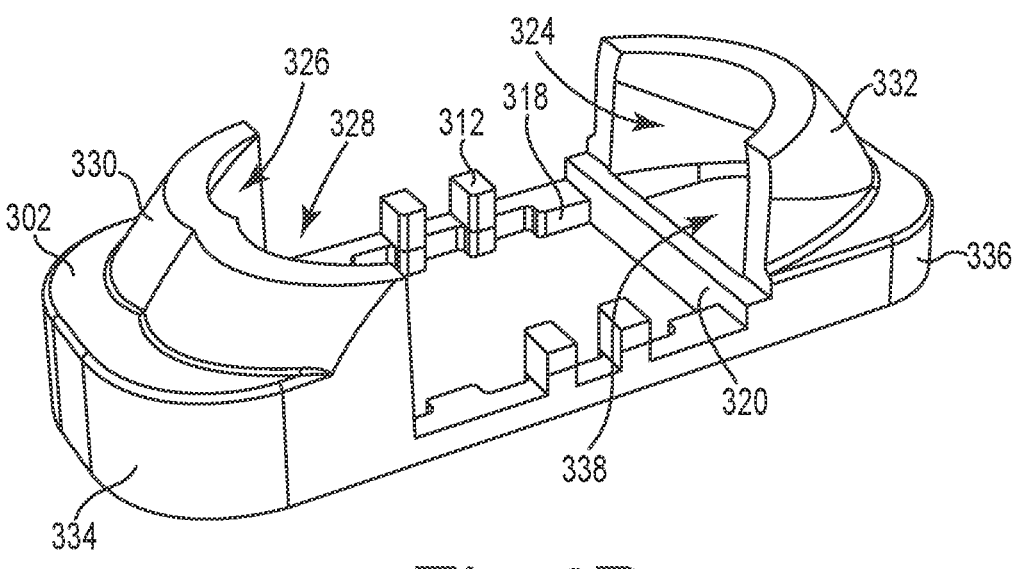
FIG. 3B is a top perspective view of the reflective component insert of a smoke detector of a fire alarm system in accordance with one or more embodiments of the present disclosure.

FIG. 3A is a top view of a reflective component insert of a smoke detector of a fire alarm system in accordance with one or more embodiments of the present disclosure. FIG. 3B is a top perspective view of the reflective component insert of a smoke detector of a fire alarm system in accordance with one or more embodiments of the present disclosure.

At 326 and 328 in FIG. 3, a reflective surface used with the double emitter structures 211 and 213 can be seen. As illustrated, the overall surface has two major portions that are each designed to interact with a respective emitter (e.g., 211 with 328 and 213 with 326). The unitary reflective component insert 302 also has a reflective surface at 324 used with the receiver structure 219.

The embodiment illustrated in FIG. 3B shows how an insert 302 has a reflective housing that forms cavities 326 and 328 therein. The emitters 211 and 213 emit light beams into the cavities 326 and 328, respectively, and the inner surfaces of the housing of the unitary reflective component insert 302 direct the light in a predictable manner out into the optical cavity (central scattering zone) of the detector device.

As can be inferred from this description, the shape of the reflective interior surfaces can be used to change the direction of the emitted light. For example, in order to integrate two emitters (e.g., IR and blue) forward scattering into the smoke chamber, a dual ellipsoidal mirror that directs light of both emitters in a central scattering zone can be utilized. For instance, each portion of the ellipsoid can be shifted and tilted 5 degrees with respect to its optical axis.

The chamber base body 306 integrates, in a unique part, the optical parts useful to direct and focus the radiation from the four emitters and scattered by smoke. These optical parts are not prisms or lenses but reflective surfaces (324, 326, and 328) of the insert 302 installed therein, with an appropriate shape, size, and position to direct the light from a light source as desired.

The geometry of these reflective surfaces is unique to the embodiments of the present disclosure. The geometry of the emitter mirror structure includes double tilted ellipsoidal mirrors (emitter mirrors 326 and 328) that collects the beams of light from two adjacent forward scattering emitters (e.g., 211, 213 of FIG. 2) and directs the light beams toward the central zone of a smoke chamber.

The emitter mirrors 326 and 328 are together composed of two portions of two ellipsoids, each of one tilted with respect to the optical axis (e.g., by ±5 degrees). Further, an ellipsoidal receiver mirror 324 collects radiation scattered by smoke particles and directs it onto the device receiver (e.g., 219 of FIG. 2).

The reflective surfaces can, for example, be made of polycarbonate with a 12-cavity injection mold to allow the PVD (physical vapor deposition) of aluminum treatment and facilitate the placement of mirrors on the frame, each shot of 12 mirrors will remain joined by its sprue. After the treatment, the mirrors still joined by their sprue, will be placed on a tray to be selected for placement on the circuit board.

The chamber base body can be assembled as follows: Acrylonitrile, Butadiene, and Styrene (ABS) or other suitable materials can be used to form the chamber base body. The body may include some elastomeric components (seals and/or gaskets). Those can, for example, be fabricated from SEBS Thermoplastic Elastomer (TPE). In some embodiments, where lightguides are added, Poly(methyl methacrylate) (PMMA) can also be used. The chamber base body can be molded with, for example, a 4-cavity mold. This process forms the chamber base body 206.

In a separate process, a polycarbonate mirror part is molded with, for example, a 12-cavity injection mold. Metallization of the polycarbonate mirrors with a PVD process can, for example, take place in a vacuum chamber to form a unitary reflective component insert 302. The sprue used to form the unitary reflective component insert 302 is then removed, for example, by a laser. Then, the pick and place process for extraction of the ABS/TPE (PMMA) parts and joining of these with the unitary reflective component insert 302 can be accomplished.

The body of the insert 302 can also be composed by different materials, using a multi-material molding process, in order to maximize reflectivity only on the surfaces that are used to direct light from emitters to the scattering zone and to focus light from the scattering zone to the receiver. In some implementations, other surfaces, not necessary to direct light or focus light, can be black or another suitable surface color/texture to absorb light and minimize unwanted reflections.

Another feature of the unitary reflective component insert 302 is a barrier 320 that is positioned at the entrance to the receiver cavity 338 that aids in avoiding direct illumination (light beams traveling directly from an emitter to the receiver) from the emitters to the receiver. This can, for example, be beneficial in case of positioning inaccuracies between the circuit board 208 and the chamber base 206.

In some embodiments, the unitary reflective component insert can include a number of alignment features. For example, FIGS. 3A and 3B have a unitary reflective component insert 302 with a number of side walls 318 that abut a corresponding number of side walls 416 within the rectangular shaped cavity 404 of FIG. 4A.

Figure 4A:
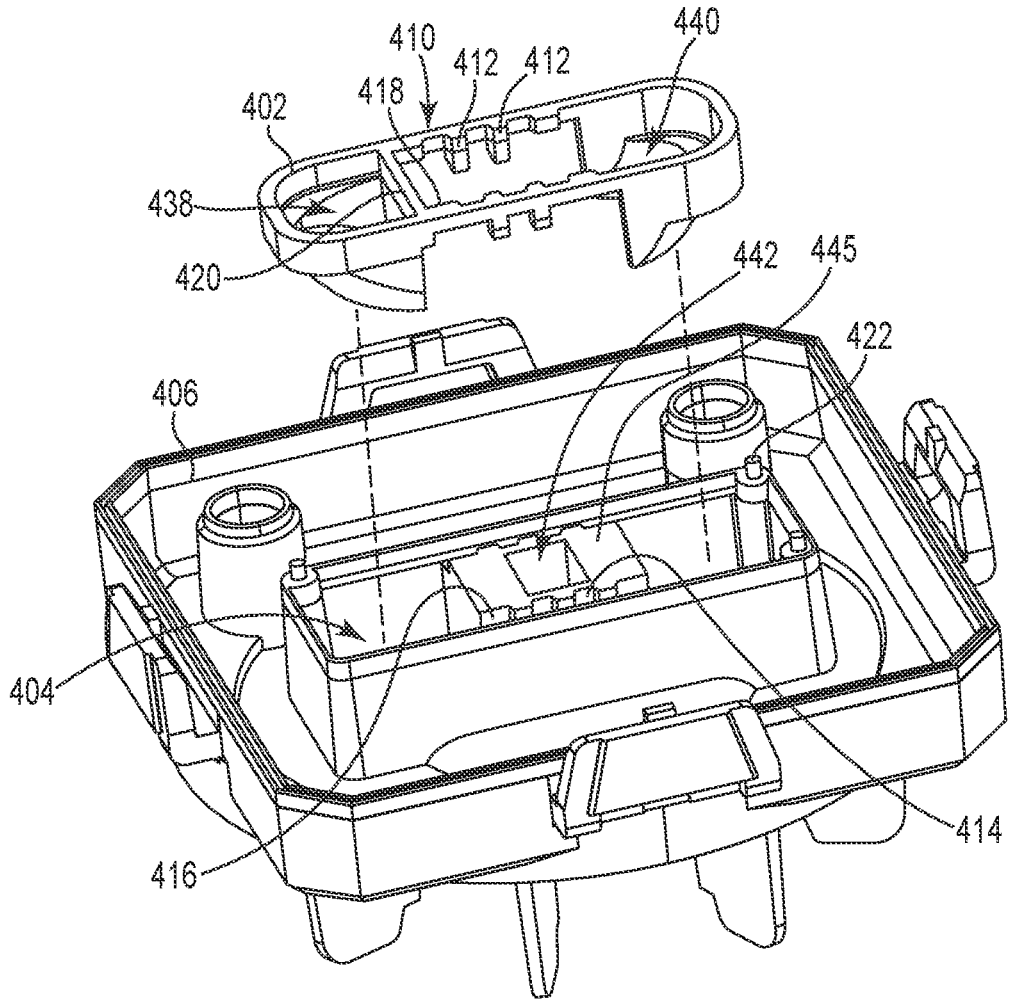
FIG. 4A is an exploded bottom perspective view of a chamber base and reflective component insert of a smoke detector optical chamber in accordance with one or more embodiments of the present disclosure.

Additionally or alternatively, the unitary reflective component insert 302 can include a number of teeth structures 312 that interlock with corresponding recess features 414 in the rectangular shaped cavity 404 of FIG. 4A. Through use of one or more of these alignment features the mirrored surfaces can be more accurately aligned with the emitters and receiver on the circuit board.

An additional mechanism that can be used to ensure proper alignment of the unitary reflective component insert 302 is that each end of the insert has a different exterior shape. For example, one end 330 has an exterior with two arched portions and the other end 332 has a single arched portion. This feature can be beneficial in arranging the emitter mirrors over the emitters and the receiver mirror over the receiver.

Another mechanism that can be used to ensure proper alignment of the unitary reflective component insert 302 is the thickness of each end of the insert. For example, as shown in FIG. 3B first end 334 has a larger thickness than end 336. These thicknesses can be easily identified and used to orient the ends of the insert correctly. Additionally, the cavity 404 can be shaped such that the insert thickness at each end well only fit in one orientation within the cavity 404.

In this manner, the unitary reflective component insert can be produced that can precisely direct light beams from multiple emitting light sources. Further, the modular design of the unitary reflective component insert can allow for precise positioning within the chamber base body and thereby precise positioning within the smoke detector, resulting in more accurate detection of smoke and more reliable fire detection.

Figure 4B:
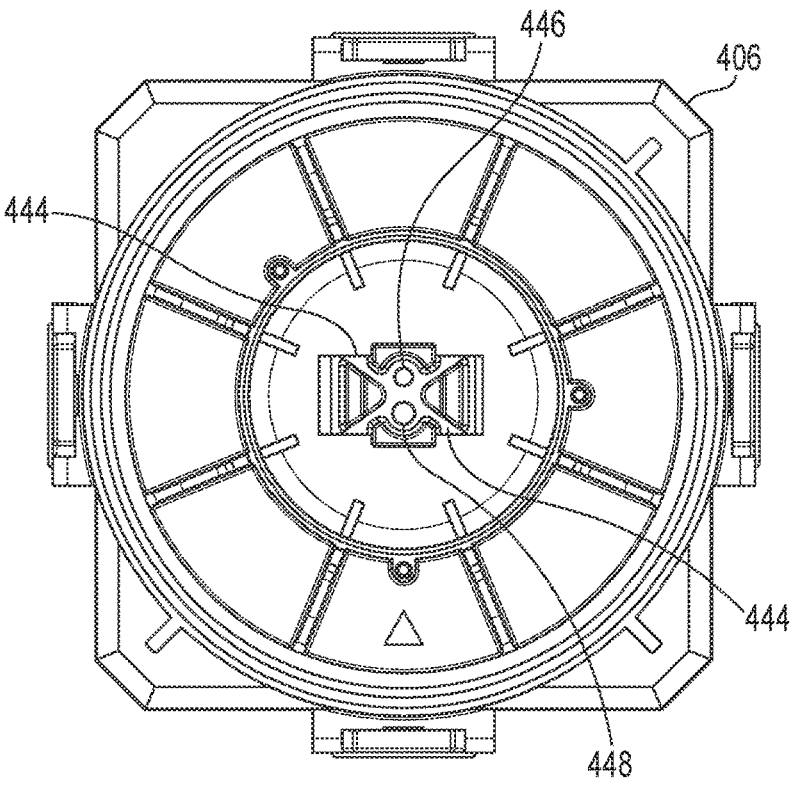
FIG. 4B is a top perspective view of a chamber base and reflective component insert of a smoke detector optical chamber in accordance with one or more embodiments of the present disclosure.
Figure 4C:
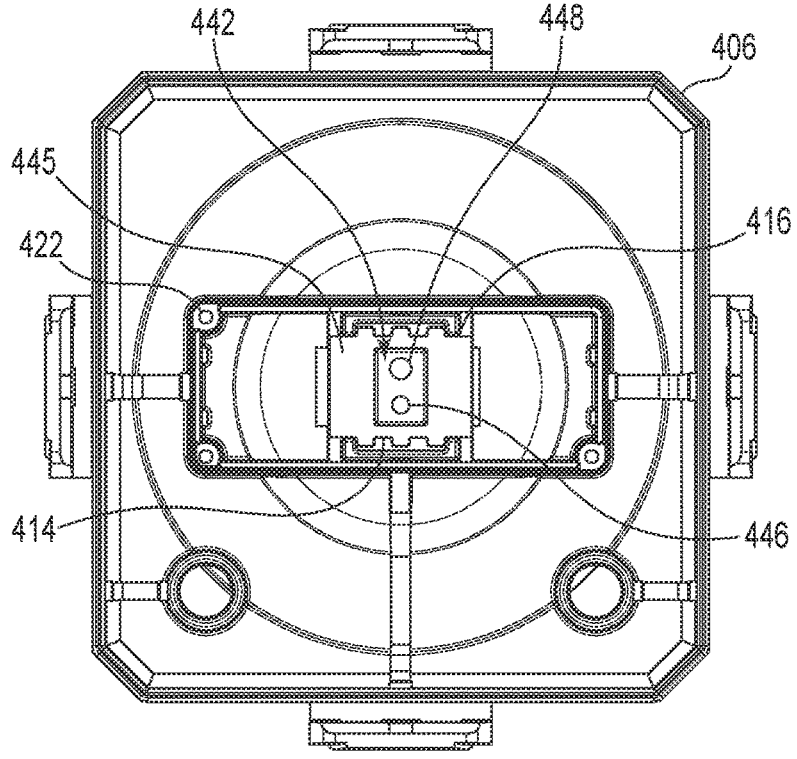
FIG. 4C is a bottom perspective view of a chamber base and reflective component insert of a smoke detector optical chamber in accordance with one or more embodiments of the present disclosure.
Figure 4D:
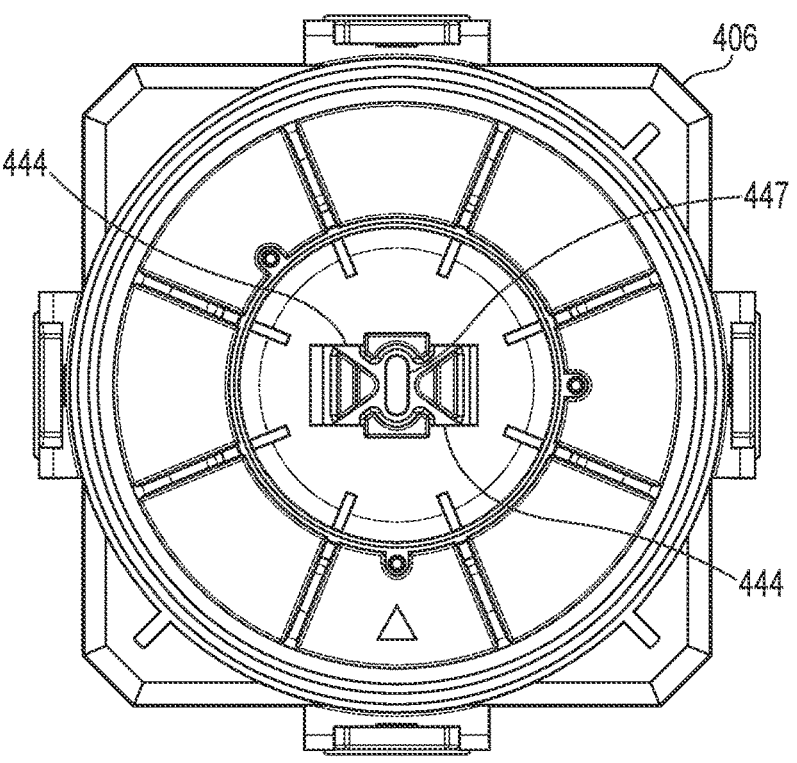
FIG. 4D is a top perspective view of a chamber base and reflective component insert of a smoke detector optical chamber in accordance with one or more embodiments of the present disclosure.
Figure 4E:
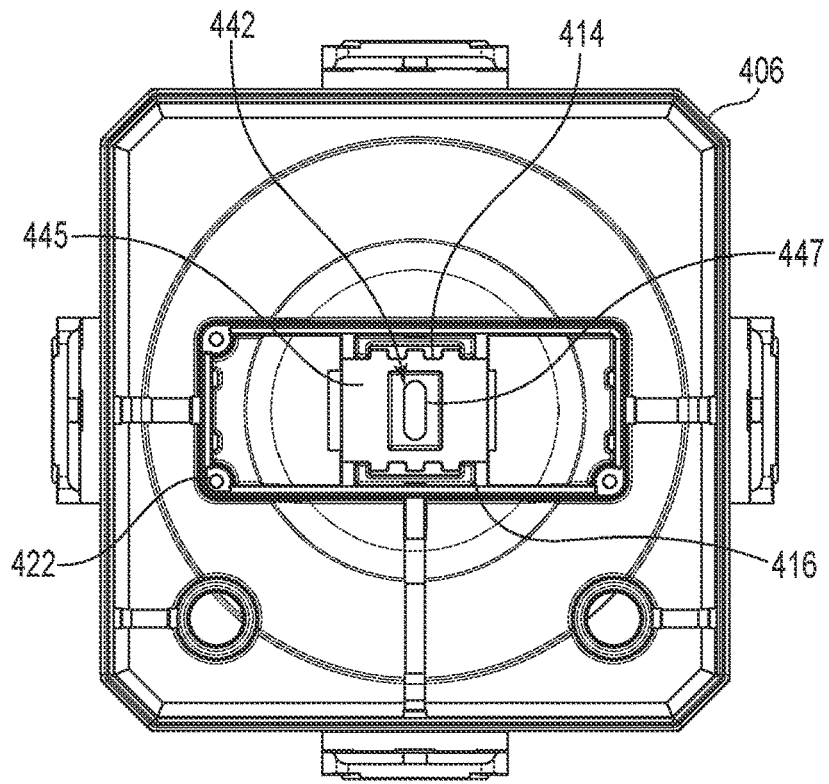
FIG. 4E is a bottom perspective view of a chamber base and reflective component insert of a smoke detector optical chamber in accordance with one or more embodiments of the present disclosure.

FIG. 4A is an exploded bottom perspective view of a chamber base and reflective component insert of a smoke detector optical chamber in accordance with one or more embodiments of the present disclosure. FIG. 4B is a top perspective view of a chamber base and reflective component insert of a smoke detector optical chamber in accordance with one or more embodiments of the present disclosure. FIG. 4C is a bottom perspective view of a chamber base and reflective component insert of a smoke detector optical chamber in accordance with one or more embodiments of the present disclosure. FIG. 4D is a top perspective view of a chamber base and reflective component insert of a smoke detector optical chamber in accordance with one or more embodiments of the present disclosure. FIG. 4E is a bottom perspective view of a chamber base and reflective component insert of a smoke detector optical chamber in accordance with one or more embodiments of the present disclosure.

In the illustration of FIG. 4A, the unitary reflective component insert 402 is being positioned into the chamber base body 406. As discussed above, the unitary reflective component insert 402 can be shaped to fit in a specific position in the chamber base body. For example, in the embodiment illustrated in FIG. 4A, the unitary reflective component insert 402 has a generally rectangular shape (when viewed from the top). The chamber base body 406, has a corresponding shaped cavity 404 wherein, when the rectangular shaped insert 402 is placed therein, it is precisely positioned in the chamber base body 406 and with respect to the emitters and receiver and their associated mirrored surfaces.

The shapes of the insert perimeter and the cavity opening do not have to match in all areas as shown in FIG. 4A. In some embodiments, only portions of each of the insert perimeter and the cavity opening have matching surfaces that mate to assist in alignment. Additionally, the shapes of the insert perimeter and cavity opening do not need to be rectangular and can be any suitable shape that can be used to assist in alignment.

The embodiment of FIG. 4A also shows alignment features such as teeth 412 on the insert 402 which interact with recesses 414 and side walls 418 on the insert 402 which interact with side walls 416.

Another alignment feature that aligns the unitary reflective component insert 402 with the emitters and receiver located on the circuit board are a number of alignment pegs 422 located at the corners of the cavity opening 404. These pegs can mate with corresponding holes precisely positioned on the surface of the circuit board so that when pegs are seated in the holes the insert 402 is precisely aligned with respect to the emitters and receiver.

Another alignment feature is depicted in FIG. 4A where the interior perimeter shape 410 mates with the exterior surface shape of the block in which the backscatter cavity 442 is located. The interior perimeter shape 410 can include the shapes of the teeth 412 the side walls 418 and surfaces of barrier 420. The exterior surface perimeter off the block on the chamber space body can include the shapes of the recesses 414 and side walls 416. FIG. 4A also illustrates barrier 420 which separates receiver cavity 438 from emitter cavity 440.

As shown in FIG. 4A, in some embodiments, a backward scattering (BS) cavity 442, can be positioned between the emitters (211 and 213) and the receiver 219 to separate the two Forward Scattering emitters and the receiver. This cavity 442 can provide several functions, including avoiding direct illumination of the receiver and hosting two backward scattering emitters. For these reasons, the backward scattering cavity 442 can have barriers (e.g., barriers 444 in FIGS. 4B and 4D) to restrict the propagation of the light beams produced from the Forward Scattering emitters and to restrict the field of view of the receiver and one or two apertures in its top to restrict the propagation of the light beams produced by the two backward scattering emitters.

These backward scattering features and other features discussed above can be seen in FIGS. 4B-4E. The backward scattering component 445 can form a cavity 442 therein that houses a backward scattering receiver or one or two backward scattering emitters. Also, as noted above, the backward scattering component can be structured to have barriers 444 and one oval shaped aperture 447 from which the infrared and blue backward scattering radiation is collected by the backward scattering receiver or from which radiation is emitted by one or two backward scattering emitters. These features can be used to control the direction from which backward scattering radiation is collected or to restrict the propagation of the light beams produced by the backward scattering emitters.

In some embodiments, the back scattering cavity can include multiple backward scattering emitters (e.g., two, 215, 217) as illustrated in FIG. 2. However, in low cost applications, one backward scattering emitter could be utilized. Additionally, the back scattering cavity can include a backward scattering receiver.

The top of the back scattering cavity 442 can be seen at the center of the chamber base 406 of FIGS. 4A-4E. The top of the back scattering cavity can have a number of apertures (e.g., apertures 446 and 448 in FIG. 4B and one aperture shown at the center of the chamber base 406 in FIG. 4D and FIG. 2) to restrict the propagation of the light beams produced by the backward scattering emitters (or, if a backward scattering receiver is provided in the back scattering cavity, restrict the field of view of the back scattering receiver). In various embodiments the multiple apertures can be different sizes, such as 446 and 448, for example based on the amount of light that need to be restricted. Some embodiments, use of a large aperture 447 instead of multiple smaller apertures in the back scattering cavity 442 can be very useful in high sense applications where more light power is needed.

The chamber base can also include "V" shaped barriers 444 that have the functionality to restrict the propagation of the light beams produced from the Forward Scattering emitters (211, 213) and to restrict the field of view of the receiver 219). For example, in FIGS. 4B and 4D the point of two V's 444 meet at the center of the chamber base 406 (generally at the locations of the apertures 446/448, 447).

Since the cavity 442 is a unitary part of the unitary reflective component insert 402, the precision between detector devices can be more accurate than a design that places one or more mirrored surfaces to achieve the reflecting of the forward scattering or backward scattering of light beams. Additionally, if the parts are formed through a molding process, the surfaces between the same parts created by the molding process can be nearly identical, which also increases predictability of detection.

As discussed, through use of the embodiments of the present disclosure smoke detectors can be more reliable, easier to manufacture, and more cost effective to produce, with more uniformity between produced devices and less opportunity for human error and can be more accurate in detecting smoke particulate in air flow. Such features can be very beneficial in detecting fires and alerting emergency personnel and building occupants early in a fire event, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A unitary reflective component insert, comprising:
   a first end including two ellipsoidal emitter mirrors shaped to direct light emitted from emitters positioned below the emitter mirrors toward a scattering zone of an optical chamber;
   a second end including a receiver mirror within a receiver cavity;
   side walls extending between the first end and the second end; and
   a barrier positioned at an entrance to the receiver cavity, extending across the insert, and terminating at each of the side walls.

2. The unitary reflective component insert of claim 1, wherein the receiver mirror is shaped to direct light scattered by smoke particulate in the scattering zone of the optical chamber toward a receiver positioned below the receiver mirror.

3. An optical chamber base, comprising:

a chamber base body having a cavity formed therein; and a unitary reflective component insert positioned in the cavity, wherein the unitary reflective component insert includes:

first end including two ellipsoidal emitter mirrors shaped to direct light emitted from emitters positioned below the emitter mirrors toward a scattering zone of an optical chamber;

a second end including a receiver mirror within a receiver cavity;

side walls extending between the first end and the second end; and a barrier positioned at an entrance to the receiver cavity, extending across the insert, and terminating at each of the side walls.

4. The optical chamber base of claim 3, wherein the unitary reflective component insert includes a number of alignment teeth that mate with a corresponding number of recesses formed on the chamber base body.

5. The optical chamber base of claim 3, wherein the side walls mate with a corresponding number of side walls formed on the chamber base body.

6. The optical chamber base of claim 5, wherein the unitary reflective component insert includes a number of alignment teeth that mate with a corresponding number of recesses formed on the chamber base body.

7. The optical chamber base of claim 3, wherein the unitary reflective component insert includes a portion of an inside perimeter surface that mates with a corresponding portion of an outer perimeter surface of a block formed within the cavity of the chamber base body.

8. The optical chamber base of claim 3, wherein the unitary reflective component insert includes a first outer end surface that has a shape that is different than a shape of a second outer end surface.

9. The optical chamber base of claim 3, wherein the unitary reflective component insert includes a first outer end surface that has a thickness that is greater than a thickness of a second outer end surface.

10. The optical chamber base of claim 3, wherein the unitary reflective component insert is fabricated from polycarbonate.

11. The optical chamber base of claim 3, wherein the chamber base body is fabricated from acrylonitrile, butadiene, and styrene.

12. The optical chamber base of claim 3, wherein the chamber base body includes at least one alignment peg that mates with a hole in a circuit board.

13. The optical chamber base of claim 3, wherein the chamber base body includes multiple alignment pegs that each mate with a corresponding hole in a circuit board.

14. A smoke detector of a fire sensing system, comprising:

a circuit board body, having:

a set of front scattering emitting light sources located on one side of an optical chamber;

a receiver of front scattering light beams from the front scattering emitting light sources and backward scattering light beams; and a set of backward scattering emitting light sources located between the set of front scattering emitting light sources and the receiver, the backward scattering light beams emitted from the backward scattering emitters; and a unitary reflective component insert including:

a first end including two ellipsoidal emitter mirrors shaped to reflect the front scattering light beams toward a scattering zone of the optical chamber;

a second end including a receiver mirror within a receiver cavity;

side walls extending between the first end and the second end; and a barrier positioned at an entrance to the receiver cavity, extending across the insert, and terminating at each of the side walls.

15. The smoke detector of claim 14, wherein the set of front scattering emitting light sources includes at least one infrared emitting light source.

16. The smoke detector of claim 14, the set of front scattering emitting light sources includes at least one blue emitting light source.

17. The smoke detector of claim 14, the set of backward scattering emitting light sources includes at least one infrared emitting light source.

18. The smoke detector of claim 14, the set of backward scattering emitting light sources includes at least one blue emitting light source.

19. The smoke detector of claim 14, wherein the unitary reflective component insert is mounted over the set of front scattering emitting light sources, the set of backward scattering emitting light sources, and the receiver.

\* \* \* \* \*